United States Patent Office 3,110,491
Patented Nov. 12, 1963

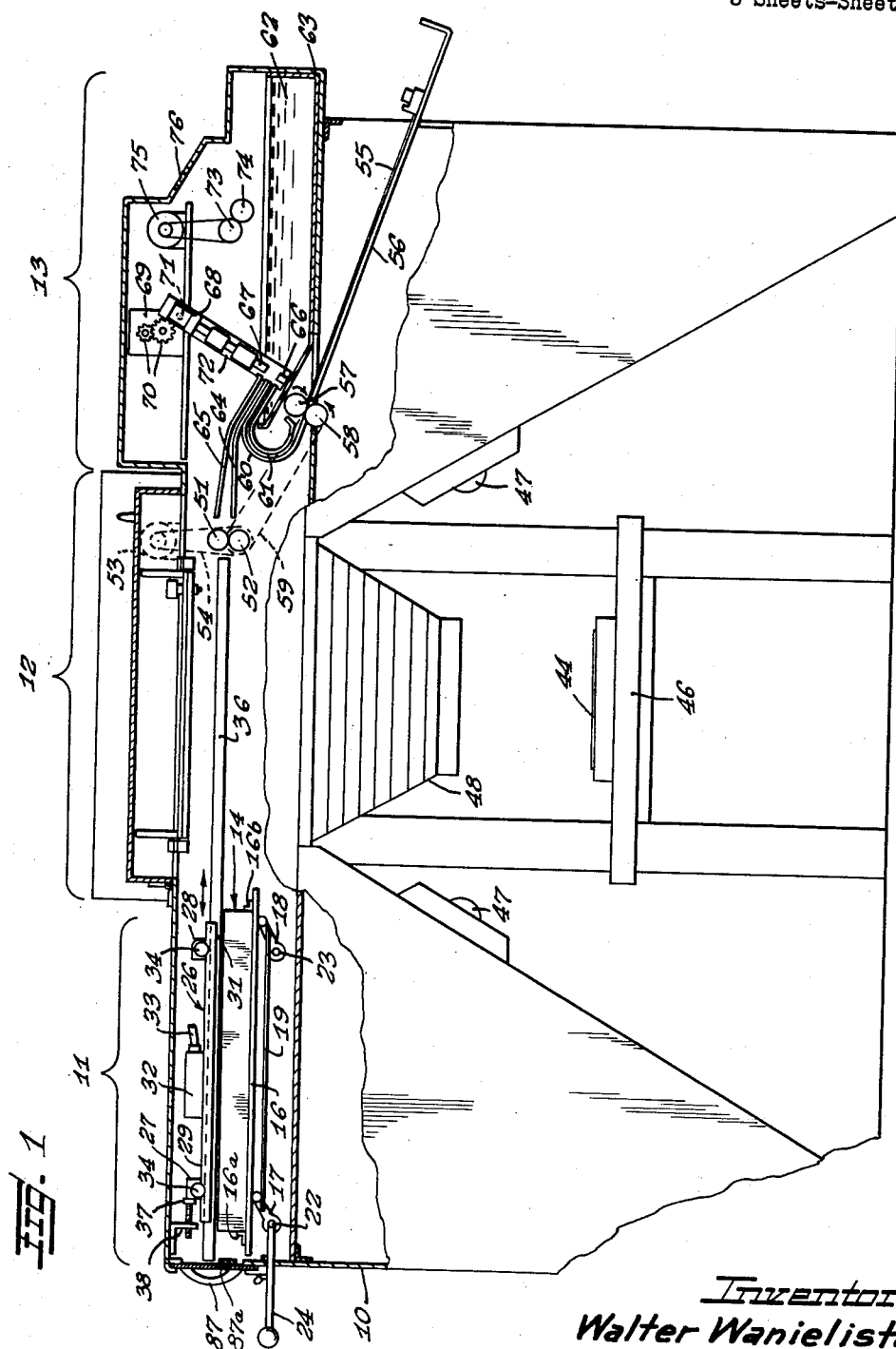

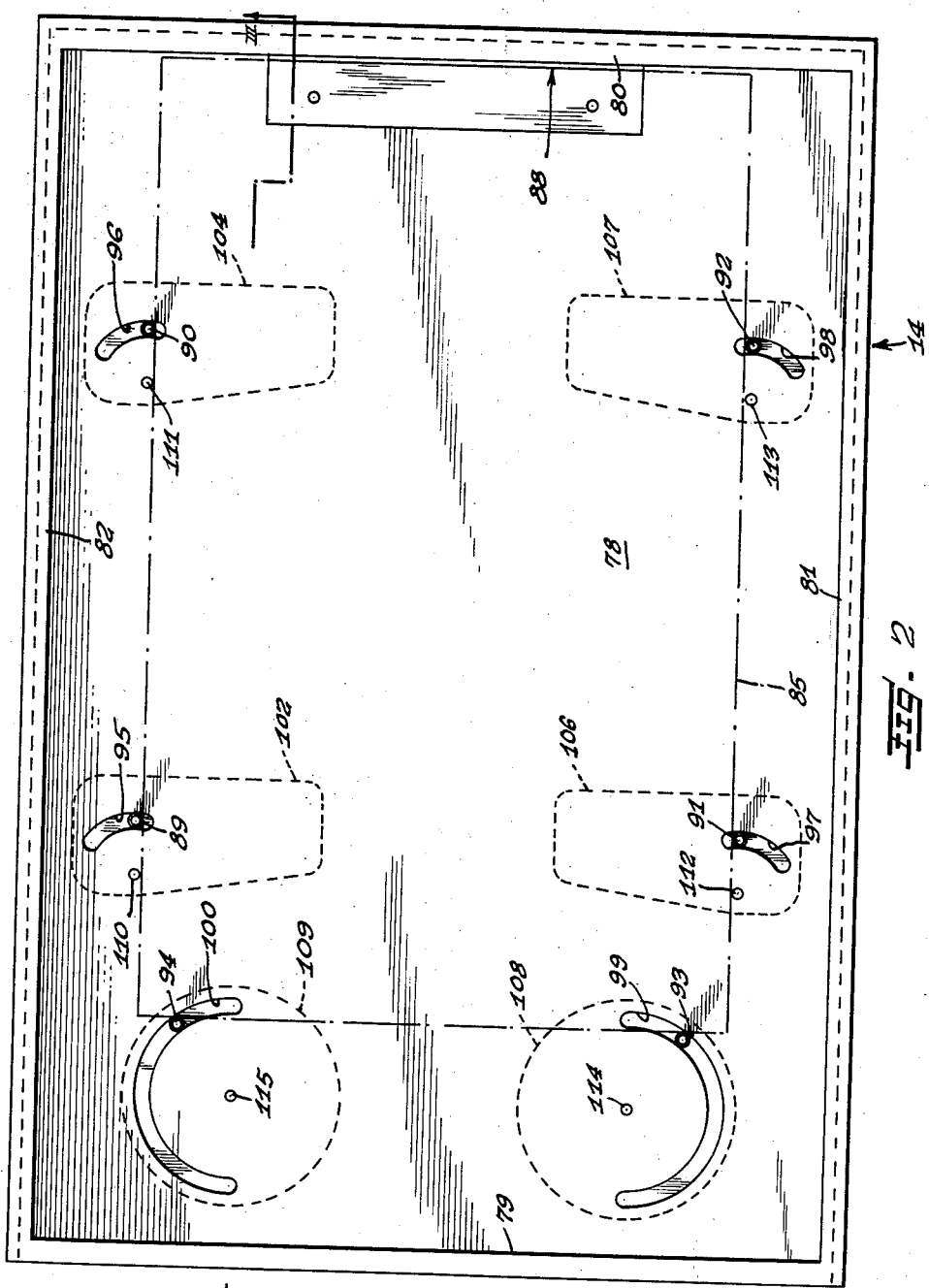

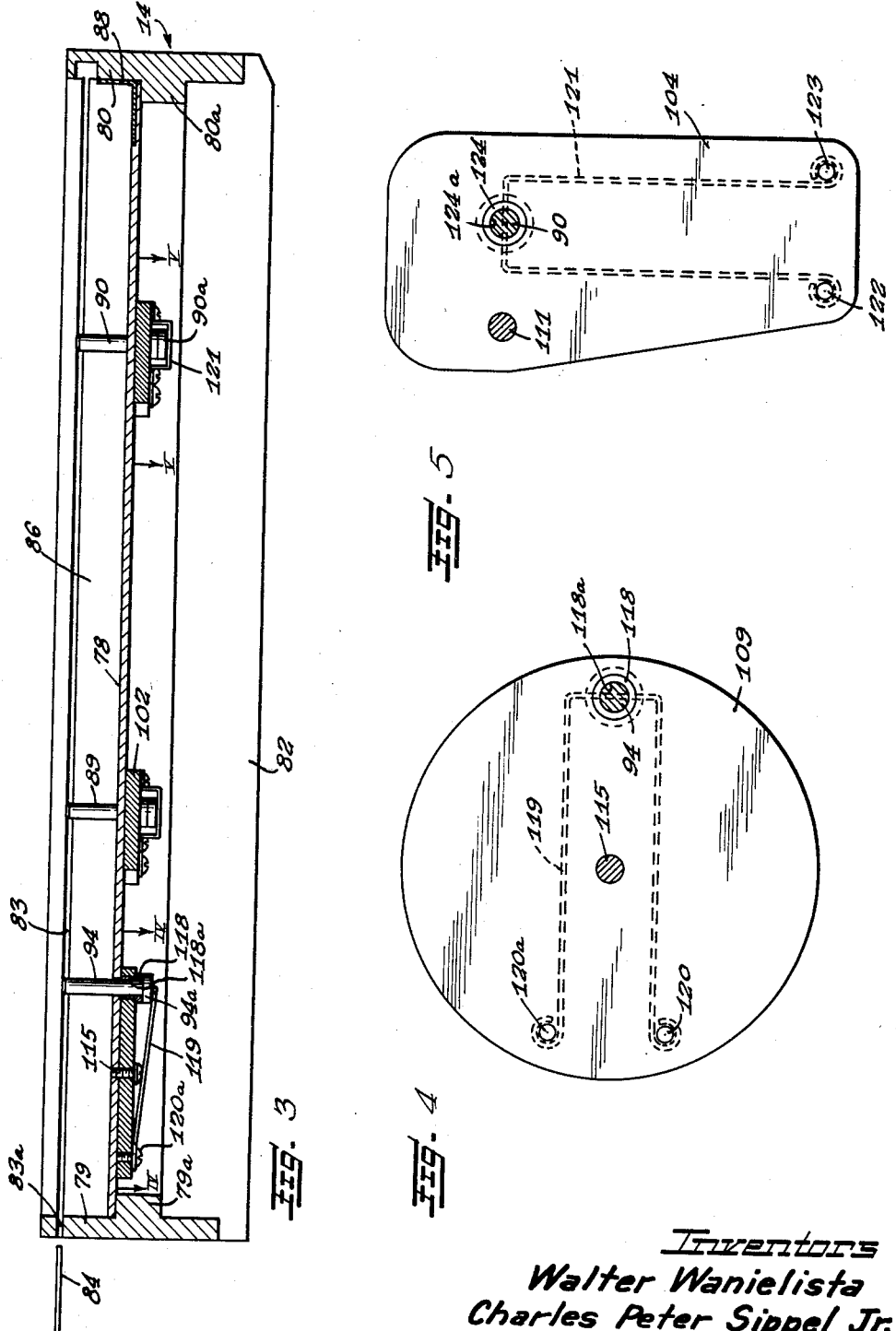

3,110,491
MAGAZINE FOR PLATE-TYPE PHOTOGRAPHIC APPARATUS
Walter Wanielista, Westchester, and Charles Peter Sippel, Jr., Villa Park, Ill., assignors to Robertson Photo-Mechanix, Inc., Chicago, Ill., a corporation of Illinois
Filed Sept. 8, 1959, Ser. No. 838,747
5 Claims. (Cl. 271—61)

The present invention relates to an improved mechanism for making printing plates and particularly to a magazine assembly for supplying a stack of photographically sensitized sheets wherein individual sheets can be removed from the top of the stack by a vacuum plate.

The present invention contemplates the provision of a magazine assembly which can be loaded with a stack of photographically sensitized sheets protected from light before placing into a machine for making photographic prints, duplicates or printing plates. The magazine employs a support plate for the stack of sheets, having a fixed stop, and movable guide pins which embrace the stack of sheets to accommodate sheets of different sizes for use in the machine. The guide pins are carried on pivotally mounted adjustment discs and adjustably move against the stack in slots in the support plate, and are resiliently biased upwardly so that they will recede to the level of the top of the stack when relative vertical movement occurs between a vacuum plate, herein referred to as a vacuum back, and the magazine for the purpose of picking up the uppermost sheet from the stack.

It is accordingly an object of the invention to provide an improved magazine as described above for supplying a photographically sensitized sheet to a photographic apparatus for making printing plates.

Another object of the invention is to provide an improved magazine for photographically sensitized sheets which will accommodate sheets of varying sizes.

A further object of the invention is to provide a mechanism for a storage supply station for a photographic apparatus wherein a stack of photographically sensitized sheets is supported and maintained in aligned relationship and sheets are individually removed from the top of a stack by a vacuum back.

A feature of the invention is to provide an improved supply mechanism for automatically supplying individual sheets from a stack of photographically sensitized sheets wherein the sheets are accurately maintained in a properly aligned position.

Other objects and advantages will become more apparent with the teaching of the principles of the invention in connection with the disclosure of the preferred embodiments thereof in the specification, claims and drawings, in which:

FIGURE 1 is a side elevational view of a photographic machine for making photographic copies or duplicates or printing plates, having parts broken away for purposes of illustration;

FIGURE 2 is a detailed plan view of a magazine for supplying photo-sensitized sheets, having a light excluding optical back or dark slide removed;

FIGURE 3 is a vertical sectional view taken substantially along line III—III of FIGURE 2;

FIGURE 4 is a horizontal sectional view taken substantially along line IV—IV of FIGURE 3; and FIGURE 5 is a horizontal sectional view taken substantially along line V—V of FIGURE 3.

As shown on the drawings:

In FIGURE 1 the reference numeral 10 indicates generally a housing for the photographic assembly embodying the principles of the invention, the assembly being divided into three sections identified as a storage supply station 11, an exposure station 12, and a developing station 13. The storage supply station 11 is made light-tight and includes a supply of photographically sensitized sheet form members such as paper in a magazine indicated at 14. The magazine will be described in further detail in connection with FIGURES 2 through 5, and is supported on a vertically movable platform 16. Magazine aligning means such as brackets 16a and 16b are provided on the platform to insure alignment of the magazine and therefore of the sheets therein which are aligned with respect to the magazine.

The platform 16 is supported on a pair of opposed arms 17 and 18 connected by means of rods 19 and secured to their respective shafts 22 and 23. The connected arms serve to raise and lower the platform 16 by the operation of a lever 24 secured to the shaft 22. Although the illustrated form of the invention contemplates a vertically movable magazine it will be appreciated that the required relative movement could also be effected by vertical adjustment of only the vacuum back or by vertical adjustment of both the magazine and the vacuum back.

The individual sheets from the magazine 16 are conveyed through the photographic assembly by means of a carrier indicated generally at 26. The carrier 26 includes cross top rails 27 and 28 secured to a top plate 29. A lower plate 31 having a grooved face is joined to the upper plate 29 to provide a vacuum plate or holder generally referred to as a vacuum back for transporting the individual sheets of paper from the magazine 14 when the magazine is elevated to bring the uppermost sheets of a stack in the magazine 14 into contact with the lower plate 31. Affixed to the top plate 29 is a vacuum box 32 which is connected by means of a flexible tube 33 to a suitable source of reduced pressure such as a pump.

The carrier 26 is moved through the assembly by means of rollers 34 which ride on rails 36 spaced inwardly from the sidewalls of the housing 10. The carrier assembly 26 is positioned automatically in proper relation to the stack of sheets in the magazine by the provision of a stop 37 which is threaded into an angle bracket 38. The stop 37 is adjustable so that the degree of overlap by which the sheet form member leads the vacuum back may be preset.

The carrier assembly 26 is detachably secured to a chain (not shown) passing over suitable sprockets to drive the carrier assembly from the supply station 11 to the exposure station 12. In the exposure station 12, a sensitized paper sheet transported by the carrier assembly 26 is exposed to produce a latent image on the sensitized face. A copy 44 to be reproduced is supported on a vertically adjustable copy table 46 and is illuminated by spaced lights 47. A camera assembly, generally indicated at 48 includes a lens system which focuses the image on the sensitized paper sheet. A suitable mechanism, not shown in detail, is provided for focusing and alignment of the sensitized sheet at the exposure station. The sensitized paper sheet is exposed for an appropriate time interval dependent upon an electrically operated timer, not shown.

After exposure, the latent image on the sensitized paper may be developed or if desired, may be transferred to a member such as illustrated herein wherein is shown a press plate member conveniently comprising a sheet of sensitized aluminum foil. The exposed paper is sent to the developing station 13 by a pair of rubber covered feed rollers 51 and 52 mounted on shafts. A motor 53 drives the shafts through a chain 54. The rollers are separable by a suitable mechanism while the paper is being moved from the supply station 12 into the exposure station 13.

In the developing station 13, a sensitized aluminum sheet press plate 55 is shown on a press plate support 56. The aluminum foil press plate 55 is sufficiently long to be received in the nip between a pair of feed rollers 57 and 58 driven by means of a belt 59 from the rollers 51 and 52. Upon energization of the motor 53, the feed rollers 51 and 52 serve to feed the sensitized aluminum foil 55 between a pair of arcuate guides 60 and 61 beneath the surface of a developing liquid 62 in a developing tank 63. At the same time the exposed paper sheet is fed by means of the rollers 51 and 52 between a pair of angular guide channels 64 and 65 into the developing solution 62. The leading edges of the exposed sheet and sensitized aluminum foil press plate 55 are brought together with the exposed surfaces of the sheet facing the sensitized surface of the aluminum foil by a pair of jaws 66 and 67 which are brought together in gripping relationship by a suitable mechanism such as an electrically operated solenoid 68. The jaws grip the paper sheet and aluminum foil and pull the sheet through the developing solution by the action of a motor 69 and gears 70. The jaws pivot around the axis provided by a shaft 71 which supports an arm 72 carrying the jaws. The speed of the motor 69 or the ratios of the gears 70 are adjusted so that the exposed sheet in the sensitized aluminum foil remain in the developing solution 62 for a time sufficient to transfer the image from the paper sheet to the sensitized aluminum foil. The sheets are then delivered into the nip existing between a pair of pressure rollers 73 and 74 driven by a motor 75 and emerge from between the rollers through a slotted opening 76. The aluminum sheet with the image transferred thereon may be stripped from the paper sheet and ready, after further drying if necessary, to be used as a printing plate on an offset printing assembly.

Returning to the details of the magazine 14 which is shown somewhat schematically in FIGURE 1, FIGURES 2 and 3 illustrate the magazine as including a support plate 78 secured within sides 79, 80, 81 and 82 which are arranged in the shape of a rectangular frame. The sides are provided with ledges, such as illustrated at 79a and 80a in FIGURE 3 for the sides 79 and 80. The support plate 78 is mounted on and suitably attached to the ledges.

The sides are provided with a groove 83 for receiving an optical back or dark slide 84. The optical back or dark slide slides within the grooves and can be slid over the magazine for keeping light from a stack 85 of photographically sensitized sheets to maintain the zone shown at 86 in FIGURE 3 in complete darkness. For this purpose, the side 79 is slotted at 83a with the slot aligned with the groove 83 for receiving the optical back 84. The magazine is loaded in a darkroom and the optical back or dark slide slid over the stack of sheets. The magazine can then be taken into the light to be loaded into the machine, as shown in FIGURE 1, by removal of a loading cover 87, which is removably mounted on the housing 10. The optical back can be drawn out through the cover such as through a suitable light excluding slot 87a.

The magazine is provided with a fixed stop 88 positioned at one end of the support plate 78 to engage the end of a stack of sheets on the support plate. The stop 88 is shown as an angularly shaped section of sheet metal or the like, and the plate is recessed so that the sheet metal stop will fit into the surface to form a planar support for the stack of sheets.

The stack of sheets is adjustably embraced by guide members mounted in said magazine to engage the edges of the stack and maintain the sheets in proper aligned position so that the individual sheets will be properly positioned when received by the vacuum back or pickup plate 26.

Guide pins 89 and 90 are positioned at one side of the magazine to engage one side of the stack of sheets and opposed guide pins 91 and 92 are positioned at the other side of the magazine. Guide pins 93 and 94 are positioned at one end of the magazine opposite the stop 88.

The guide pins 89 and 90 are adjustably movable in arcuate slots 95 and 96 while the pins 91 and 92 are adjustably movable in arcuate slots 97 and 98. The slots extend toward the stack so that pins can be moved up to the stack thus making it possible to accommodate stacks of different sizes. Similarly, the pins 93 and 94 are movable in arcuate slots 99 and 100 which extend toward the end of the stack.

The pins are mounted upright to extend up through the slots along the side of a stack, and are mounted on flat adjustment plates or adjustment discs. The pins 89 and 90 are mounted on the adjustment plates 102 and 104 and the pins 91 and 92 are mounted on the plates 106 and 107. The pins 93 and 94 are mounted on the adjustment discs 108 and 109. The plates and discs are so shaped that they can be easily manually pivoted to accurately adjust the position of the pins supported thereon. Plates 102 and 104 are supported on pivot pins 110 and 111 and the plates 106 and 107 are supported on pivot pins 112 and 113. The discs 108 and 109 are supported on pivot pins 114 and 115, with each of the pivot pins being illustrated in the form of a bolt threaded upwardly into the support plate 78, as illustrated in FIGURES 2 through 5.

The pins are mounted for axial sliding movement relative to the support plate 78 and to their adjustment plates and discs. Since each of the plates and each of the discs is substantially similar in construction, only one of each will be described in detail in connection with the illustration of FIGURES 3, 4 and 5.

The adjustment disc 109, as illustrated in FIGURE 4, is provided with a sleeve insert 118 to provide a sliding hole 118a for supporting the pin 94. The pin is urged upwardly by resilient biasing spring 119 which is U-shaped and has eyelets formed at the end secured to the flat undersurface of the adjustment disc 109 to tend to hold the spring 119 flat against the lower surface of the disc. The base of the spring engages the head 94a of the pin 94.

As illustrated in FIGURE 5, the adjustment plate 104 has a U-shaped spring 121 secured to its lower flat surface by attachment members 122 and 123 passing through eyelets at the ends of the spring. The spring is held flat with its base end engaging the head 90a of the pin. The pin is slidable in a sleeve bushing 124 which provides an opening 124a for the pin.

Each of the pins is provided with a similar spring which bias the pin resiliently upwardly. The pins are thus positioned to project above the surface of the support plate 78 to the top of a stack of sheets which is loaded therein. However, as the stack is lowered by removing sheets therefrom, the vacuum back will depress the pins as it engages their heads to reach the top sheet each time a sheet is removed. That is, as the magazine is raised against the vacuum back 26 in FIGURE 1, the pins will recede as they engage the vacuum back permitting it to flatten against the top sheet to remove it. The pins thus hold the stack in alignment until it is depleted and do not interfere with the adjustment of the pins. This adjustment is preset prior to the insertion of the stack into the magazine in the darkroom. For example, an operator may separate the guide pins by moving pins 89 and 90 to the outer ends of their slots 95 and 96, and separates the pins 91 and 92 by moving them to the outer ends of their slots 97 and 98. Likewise, pins 93 and 94 are moved to the outer ends of their slots 99 and 100. A stack of photographically sensitized paper is positioned in the magazine on the support plate 78, and the adjustment plates and discs rotated to bring the pins alongside the stack to hold the sheets in alignment. The optical back 84 is slid over the top of the stack and the magazine is placed in the machine as illustrated in FIGURE 1, with the optical back being withdrawn before the door 87 is closed. The machine is then ready for operation and will continue to operate satisfactorily holding the sheets in perfect alignment until the stack is used up.

Thus it will be seen that we have provided an improved photographic apparatus for making photographic copies or printing plates having a magazine and meeting the objectives and advantages hereinabove set forth.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. In a magazine assembly for a photographic apparatus, a support plate for holding a stack of photographically sensitized sheets, means defining an arcuate slot in said plate leading toward a stack of sheets on the plate, a guide pin projecting upwardly through said slot, an adjustment member supporting the pin being pivotally mounted on the support plate at the radial center of said arcuate slot, said adjustment member being rotatable about its pivotal mount for adjustably positioning said pin in a desired location along said slot relative to the edge of the stack of sheets, and a biasing means connected to said guide pin urging the pin upwardly in all positions of said adjustment member so it will recede when a pickup member vertically engages the uppermost sheet on the plate.

2. In a magazine assembly for photographic apparatus, a support plate for holding a stack of photographically sensitized sheets, means defining an arcuate slot in said plate leading toward a stack of sheets on the plate, a guide pin projecting upwardly through said slot, an adjustment disc pivotally mounted beneath the plate and having a pin-supporting opening with the pin axially slidable therein, said disc being rotatable about its pivotal mount for adjustably positioning said pin in a desired location along said slot relative to the edge of the stack of sheets, and a U-shaped spring having the ends secured to the lower surface of the disc and carried thereon with the base of the spring engaging the pin and resiliently urging it upwardly in all portions of the disc.

3. In a magazine assembly for a photographic apparatus, a support member for holding a stack of photographically sensitized sheets, a fixed stop positioned to engage one end of a stack of sheets on the support member, a pair of guide members positioned to engage the sides of the stack and being mounted on the support member for lateral adjustment, an end guide member positioned to engage the end of the stack opposite said stop and being mounted on the support member for lateral adjustment, a pickup plate member above said support member parallel thereto, means for relatively moving the pickup member against the top of the stack, said pickup member extending over the sides of the stack to engage the guide members, and yieldable biasing means biasing each of said guide members resiliently upwardly so that the pickup member may relatively vertically engage the guide members and the top surface of the uppermost sheet and the guide members will recede to accommodate pickup member contact with the top sheet.

4. In a storage supply station for a photographic apparatus having a magazine assembly, a support magazine with an open top for holding a stack of photographically sensitized sheets, a light excluding member removably positioned over the top of said magazine, a fixed stop positioned in the magazine to engage one end of a stack of sheets therein, a pair of guide members in the magazine positioned to engage the sides of the stack and being mounted for lateral adjustment, an end guide member positioned in the magazine to engage the end of the stack opposite said stop and being mounted for lateral adjustment, biasing means biasing each of said guide members resiliently upwardly to extend above the top of the stack, a pickup member extending over the sides of the stack, and means for moving said magazine vertically to a pickup position with the pickup member being against the uppermost sheet of the stack and engaging the guide member in said pickup position wherein said guide members recede against said biasing means from a position extending above the stack.

5. A storage supply mechanism for a machine for reproducing images on photosensitive sheets comprising a closed housing defining a magazine chamber therein, a horizontally extending support member in said chamber, a loading door on an opening in the housing leading laterally to said support member, a fixed end stop means at a location opposite said door for positioning one end of a stack of sheets placed on the support member through said door, lateral guide members projecting upwardly at each side of the support member for positioning the sides of said stack of sheets, a front guide member projecting upwardly from the support member adjacent the door for positioning the other end of the stack of sheets, vertically yieldable supports for each of the guide members with means biasing the members upwardly above the support member and the stack, means for laterally adjusting the position of each of said guide members to move them against the stack of sheets, a horizontally extending pickup plate positioned above the support member extending beyond the edges of the stack to engage the guide members and the top of the stack when said support member is relatively elevated, and means for moving the support member and stack relative to the pickup member for removing individual sheets from the top of the stack whereby the yieldable supports for each of the guide members will permit downward recession of the guide members to the level of the top of the stack.

References Cited in the file of this patent

UNITED STATES PATENTS

| | | |
|---|---|---|
| 55,774 | Kirk | June 19, 1866 |
| 567,043 | Reisser | Sept. 1, 1896 |
| 1,326,334 | Gaffney | Dec. 30, 1919 |
| 1,830,604 | Holmgren | Nov. 3, 1931 |
| 2,235,844 | Nelson | Mar. 25, 1941 |
| 2,371,925 | Schade | Mar. 20, 1945 |
| 2,925,025 | Conner | Feb. 16, 1960 |